(12) United States Patent
Wang et al.

(10) Patent No.: US 6,211,311 B1
(45) Date of Patent: Apr. 3, 2001

(54) SUPPORTED OLEFIN POLYMERIZATION CATALYSTS

(75) Inventors: Shaotian Wang, Mason; Bradley P. Etherton; Karen E. Meyer, both of Cincinnati; Michael W. Lynch, West Chester; Linda N. Winslow, Cincinnati; Leonard V. Cribbs, Hamilton; Jia-Chu X. Liu, Mason, all of OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/318,008

(22) Filed: May 25, 1999

(51) Int. Cl.$^7$ ....................................................... C08F 4/42
(52) U.S. Cl. ..................... 526/131; 526/128; 526/129; 526/160; 526/170; 526/172; 526/348; 502/152; 502/155; 502/158
(58) Field of Search ..................... 502/152, 155, 502/158; 526/128, 131, 129, 160, 170, 172, 348

(56) References Cited

U.S. PATENT DOCUMENTS

| | | | |
|---|---|---|---|
| 4,508,843 | 4/1985 | Etherton et al. | 502/115 |
| 4,530,913 | 7/1985 | Pullukat et al. | 502/104 |
| 4,565,795 | 1/1986 | Short et al. | 502/110 |
| 4,752,597 | 6/1988 | Turner | 502/104 |
| 4,791,180 | 12/1988 | Turner | 526/160 |
| 4,808,561 | * 2/1989 | Welborn, Jr. | 502/104 |
| 5,153,157 | 10/1992 | Hltatky et al. | 502/117 |
| 5,198,401 | 3/1993 | Turner et al. | 502/155 |
| 5,241,025 | 8/1993 | Hlatky et al. | 526/129 |
| 5,539,124 | 7/1996 | Etherton et al. | 548/402 |
| 5,554,775 | * 9/1996 | Krishnamurti et al. | 556/7 |
| 5,637,660 | 6/1997 | Nagy et al. | 526/160 |
| 5,744,417 | 4/1998 | Nagy et al. | 502/155 |
| 5,801,113 | 9/1998 | Jejelowo et al. | 502/104 |

FOREIGN PATENT DOCUMENTS

WO 96/34021   10/1996   (WO).

* cited by examiner

*Primary Examiner*—David W. Wu
*Assistant Examiner*—Ling-Siu Choi
(74) *Attorney, Agent, or Firm*—Kevin M. Carroll; Jonathan L. Schuchardt

(57) ABSTRACT

A supported olefin polymerization catalyst system and a method of making it are disclosed. The catalyst system comprises: (a) a support chemically treated with an organoaluminum, organosilicon, organomagnesium, or organoboron compound; (b) a single-site catalyst that contains a polymerization-stable, heteroatomic ligand; and (c) an activator. Chemical treatment is a key to making supported heterometallocenes that have high activity and long shelf-lives, and can effectively incorporate comonomers.

16 Claims, No Drawings

SUPPORTED OLEFIN POLYMERIZATION CATALYSTS

FIELD OF THE INVENTION

This invention relates to a supported catalyst for polymerizing olefins and its method of producton. The catalyst comprises a support treated with an effective amount of a chemical modifier, a single-site catalyst containing at least one anionic, polymerization-stable, heteroatomic ligand, and an activator. The modifier is an organoaluminum, organosilicon, organomag nesium, or organoboron compound.

BACKGROUND OF THE INVENTION

Many olefin polymerization catalysts are known, including conventional Ziegler-Natta catalysts. While these catalysts are inexpensive, they exhibit low activity, produce polymers having narrow to medium molecular weight distributions ($M_w/M_n > 4$), and are generally poor at incorporating a-olefin comonomers. To improve polymer properties, highly active single-site catalysts, in particular metallocenes, are beginning to replace Ziegler-Natta catalysts. Although more expensive, the new catalysts give polymers with narrow molecular weight distributions, and good comonomer incorporation, which allows easier production of low-density polymers. One disadvantage of metallocene catalysts is that they tend to produce lower molecular weight polymers at higher temperatures.

Recent attention has focused on developing improved single-site catalysts in which a cyclopentadienyl ring ligand is replaced by a heteroatomic ring ligand. These catalysts may be referred to generally as "heterometallocenes."

In particular, U.S. Pat. No. 5,554,775 discloses single-site catalysts containing a boraaryl moiety such as boranaphthalene or boraphenanthrene. U.S. Pat. No. 5,539,124 discloses catalysts containing a pyrrolyl ring, i.e., an "azametallocene." Further, U.S. Pat. No. 5,637,660 discloses catalysts in which a cyclopentadienyl moiety of a metallocene is replaced by a readily available quinolinyl or pyridinyl ligand. In addition, PCT Int. Appl. WO 96/34021 discloses azaborolinyl heterometallocenes wherein at least one aromatic ring includes both a boron atom and a nitrogen atom.

Single-site catalysts are typically soluble in the polymerization reaction medium and are therefore valuable for solution processes. However, for gas-phase, slurry, and bulk monomer processes, it is useful to immobilize the catalyst on a carrier or support in order to control polymer morphology. Much effort has focussed on supporting metallocene and Ziegler-Natta catalysts. Various supports are taught, particularly inorganic oxides. Support modification techniques, which can improve activity, are also known. For example, supports for Ziegler-Natta catalysts modified with organomagnesiums, organosilanes, and organoboranes are disclosed in U.S. Pat. Nos. 4,508,843, 4,530,913, and 4,565, 795. Metallocene catalyst support modification with organosilanes and aluminum, zinc, or silicon compounds is taught in U.S. Pat. Nos. 4,808,561 and 5,801,113.

In contrast, relatively little is known about supporting heterometallocenes. U.S. Pat. No. 5,744,417 discloses a silylamine polymer support, but the examples use only a metallocene catalyst. U.S. Pat. Nos. 5,554,775, 5,539,124, and 5,637,660 and PCT Int. Appl. WO 96/34021 teach that heterometallocenes can be supported on inorganic oxides, but these references give no examples.

Many heterometallocenes are inherently unstable. U.S. Pat. Nos. 5,554,775 and 5,539,124 teach that the catalyst should be used shortly after preparation because activity is lost on storage. Moreover, our own initial efforts to make supported heterometallocenes using untreated supports were largely unsuccessful (see Comparative Example 8 and Table 6 below). New supports for heterometallocenes would ideally provide for increased storage stability.

In sum, new supported heterometallocene catalysts and methods of making them are needed. Particularly valuable supported catalysts would have improved shelf-life and would give polymers with enhanced properties. Ideally, the new supports would have a negligible negative effect on catalyst activity.

SUMMARY OF THE INVENTION

The invention is a supported catalyst system and a method of making it. The catalyst system comprises a chemically treated support, a single-site catalyst that contains at least one anionic, polymerization-stable, heteroatomic ligand, and an activator. The support is modified by treating it with an effective amount of an organoaluminum, organosilicon, organomagnesium, or organoboron compound.

We surprisingly found that chemical modification is a key to making superior supported heterometallocenes for olefin polymerization. In particular, catalysts of the invention have higher activities and longer shelf-lives than comparable catalysts for which the support is not modified. In addition, the new catalysts more effectively incorporate comonomers, which is important for controlling polymer density.

DETAILED DESCRIPTION OF THE INVENTION

Supported catalyst systems of the invention include a single-site catalyst, an activator, and a chemically treated support.

"Single-site" catalysts include both metallocenes and nonmetallocenes. They are transition metal catalysts that are distinct chemical species rather than mixtures of different species. Single-site catalysts typically give polyolefins with characteristically narrow molecular-weight distributions ($M_w/M_n < 3$) and good, uniform comonomer incorporation. In addition, the catalysts produce polyolefins with a wide range of melt indices compared with those of polyolefins that are readily accessible with Ziegler-Natta catalysts.

Single-site catalysts useful in the invention contain at least one anionic, polymerization-stable, heteroatomic ligand Suitable heteroatomic ligands include substituted or unsubstituted boraaryl, pyrrolyl, quinolinyl, and pyridinyl groups as described in U.S. Pat. Nos. 5,554,775, 5,539,124, and 5,637,660, the teachings of which are also incorporated herein by reference. Substituted or unsubstituted azaborolinyl ligands, such as those described in PCT Int. Appl. WO 96/34021 can also be used. The polymerization-stable ligands may also include cyclopentadienyl (substituted or unsubstituted) anions such as those described in U.S. Pat. Nos. 4,791,180 and 4,752,597, the teachings of which are incorporated herein by reference.

The polymerization-stable anionic ligands can be bridged. Groups that can be used to bridge the polymerization-stable anionic ligands include, for example, methylene, ethylene, 1,2-phenylene, and dialkyl silyls. Normally, only a single bridge is used in the single-site catalyst. Bridging the ligand changes the geometry around the transition metal and can improve catalyst activity and other properties, such as comonomer incorporation and thermal stability.

The single-site catalyst includes a transition or lanthanide metal. Preferably, the metal is from Groups 3 to 10 of the Periodic Table. More preferred catalysts include a Group 4 to 6 transition metal; most preferably, the catalyst contains a Group 4 metal such as titanium or zirconium.

The single-site catalyst usually includes at least one other ligand. Preferably, the other ligand is hydride, halide, $C_1$–$C_{20}$ alkoxy, siloxy, hydrocarbyl, or dialkylamido. More preferably, the ligand is hydride, chloride, bromide, $C_1$–$C_8$ alkoxy, $C_3$–$C_{18}$ trialkylsiloxy, methyl, phenyl, benzyl, neopentyl, or $C_2$–$C_6$ dialkylamido. Particularly preferred are hydrocarbyl groups that do not undergo β-hydrogen elimination reactions (e.g., olefin formation with loss of M-H); examples of preferred hydrocarbyl groups are methyl, phenyl, benzyl, neopentyl, and the like.

Suitable activators include alumoxanes. Preferred alumoxanes are polymeric aluminum compounds represented by the cyclic formula $(R^1\text{—Al—O})_s$ or the linear formula $R^1(R^1\text{—Al—O})_s AlR^1$ wherein $R^1$ is a $C_1$–$C_5$ alkyl group and s is an integer from 1 to about 20. Preferably, $R^1$ is methyl and s is from about 4 to about 10. Exemplary alumoxane activators are (poly)methylalumoxane (MAO), ethylalumoxane, and diisobutylalumoxane. Optionally, the activator is a trialkyl or triaryl aluminum compound, which preferably has the formula $AlR^2_3$ where $R^2$ denotes a $C_1$–$C_{20}$ hydrocarbyl.

Suitable activators also include substituted or unsubstituted trialkyl or triaryl boron derivatives, such as tris(pentafluorophenyl)borane, and ionic borates such as N,N-dimethylanilinium tetrakis(pentafluorophenyl)borate, or trityl tetrakis(pentafluorophenyl)borate. The boron-containing activators ionize the neutral organometallic compound to produce an active, cationic catalyst for olefin polymerization. See, for instance, U.S. Pat. Nos. 5,153,157, 5,198,401, and 5,241,025, all of which are incorporated herein by reference.

The molar ratio of the metal of the activator component to the transition metal of the single-site catalyst is preferably in the range of about 0.3:1 to 1000:1, more preferably from about 20:1 to 800:1, and most preferably from about 50:1 to 500:1. Where the activator is an ionic borate, the molar ratio of the metal of the activator component to the transition metal of the single-site catalyst is preferably in the range of about 0.3:1 to 3:1.

The singlesite catalyst is immobilized on a support, which is preferably a porous material. The support can be inorganic oxides, inorganic chlorides, inorganic silicates, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred supports include silica, alumina, silica-aluminas, zeolites, magnesias, titania, zirconia, magnesium chloride, and polystyrene.

Preferably, the support has a surface area in the range of about 10 to about 700 $m^2$/g, more preferably from about 50 to about 500 $m^2$/g, and most preferably from about 100 to about 400 $m^2$/g. Preferably, the pore volume of the support is in the range of about 0.1 to about 4.0 mL/g, more preferably from about 0.5 to about 3.5 mL/g, and most preferably from about 0.8 to about 3.0 mL/g. Preferably, the average particle size of the support is in the range of about 1 to about 500 μm, more preferably from about 2 to about 200 μm, and most preferably from about 5 to about 100 μm. The average pore diameter is typically in the range of about 10 to about 1000 Å, preferably about 20 to about 500 Å, and most preferably about 50 to about 350 Å.

The single-site catalysts are supported using any of a variety of immobilization techniques. In one method, the single-site catalyst is dissolved in a solvent and combined with the support. Evaporation of the solvent gives a supported catalyst. An incipient wetness method can also be used. The activator can also be deposited on the support or it can be introduced into the reactor separately from the catalyst.

Before the support is combined with the single-site catalyst, it is chemically modified by treatment with an organoaluminum, organosilicon, organomagnesium, or organoboron compound. We surprisingly found that this chemical treatment is crucial for improving the activity and shelf stability of supported single-site catalysts that contain a polymerization-stable heteroatomic ligand. We discovered that heterometallocenes, unlike their metallocene counterparts (based on cyclopentadienyl or indenyl ligands only, e.g.), are much more prone to deactivation by common catalyst supports (See Comparative Example 8 and Table 6 below). Treatment of the supports as described herein overcomes the stability problems of supported heterometallocenes.

Preferred modifiers are alumoxanes, alkyl aluminums, alkyl aluminum halides, alkylsilyl halides, alkyldisilazanes, alkyl and aryl alkoxysilanes, aryl and alkyl magnesium compounds, and alkyl, aryl, and alkoxy boron compounds.

Suitable alumoxanes include polymeric aluminum compounds represented by the cyclic formula $(R^3\text{—Al—O})_s$ or the linear formula $R^3(R^3\text{—Al—O})_s AlR^3$ wherein $R^3$ is a $C_1$–$C_5$ alkyl group and s is an integer from 1 to about 20. Preferably, $R^3$ is methyl and s is from about 4 to about 10. Exemplary alumoxane activators are (poly)methylalumoxane (MAO), ethylalumoxane, and diisobutylalumoxane.

Preferred alkyl aluminums include trialkyl or triaryl aluminum compound, which preferably has the formula $AlR^4R^5R^6$ where $R^4$, $R^5$, and $R^6$ denote the same or different $C_1$–$C_{20}$ hydrocarbyl. Particularly preferred alkyl aluminums are trimethylaluminum, triethylaluminum, tripropylaluminum, and triisobutylaluminum.

Suitable alkyl aluminum halides include dialkyl aluminum halide and alkyl aluminum dihalide compounds, which preferably have the formula $AlR^4R^5$ or $AlR^4X_2$ where X is Cl, Br, or I. Exemplary alkyl aluminum halides are dimethylaluminum chloride, methylaluminum dichloride, diethylaluminum chloride, ethylaluminum dichloride, diisobutylaluminum chloride and isobutylaluminum dichloride.

Preferred alkylsilyl halides include trialkylsilyl halides, dialkylsilyl dihalides, and alkylsilyl trihalides, compounds, which preferably have the formula $R^4R^5R^6SiX$, $R^4R^5SiX_2$ or $R^4SiX_3$. Particularly preferred alkylsilyl halides are trimethylchlorosilane, dimethyldichlorosilane, t-butyldimethylchlorosilane, and trimethylsilyl iodide.

Suitable alkyl disilazanes include hexaalkyl disilazanes having the formula $R^4_3SiNHSiR^4_3$. In particular, hexamethyldisilazane is preferred.

Preferred alkyl or aryl alkoxysilanes include trialkyl alkoxysilanes, dialkyl dialkoxysilanes, and alkyl trialkoxysilanes, which preferably have the formula $R^4R^5R^6Si(OR^7)$, $R^4R^5Si(OR^6)(OR^7)$ or $R^4Si(OR^5)(OR^6)(OR^7)$ where $R^4$, $R^5$, $R^6$, and $R^7$ denote the same or different $C_1$–$C_{20}$ hydrocarbyl. Exemplary alkyl alkoxysilanes are cyclohexylmethyldimethoxysilane, methyltrimethoxysilane, methyltriethoxysilane, phenyltriethoxysilane, and dicyclopentyldimethoxysilane.

Suitable organomagnesium compounds have one or more alkyl, aryl, or aralkyl groups; they may also have one halide, alkoxy, or aryloxy group. Preferred organomagnesium compounds have two alkyl, aryl, or aralkyl groups. Suitable organomagnesium compounds include, for example, diethylmagnesium, dibutyl magnesium, butylmagnesium methoxide, diphenylmagnesium, dibenzylmagnesium, Grignard reagents such as ethylmagnesium chloride, and the like, and mixtures thereof.

Preferred alkyl, aryl, and alkoxy boron compounds include trialkylboranes, triarylboranes, and trialkoxyboranes having the formula $R^4R^5R^6B$ or $B(OR^4)(OR^5)(OR^6)$. Most preferred are trimethylborane, triethylborane, tripropylborane, triisobutylborane, trimethoxyborane, triethoxyborane, tripropoxyborane, and triphenoxyborane.

The modifier is added to the support in an amount preferably in the range of about 0.1 to 20 mmoles of metal (contained in the modifier) per gram of support, more preferably from about 0.2 to 10 mmoles/gram, and most preferably from about 0.5 to 5 mmoles/gram. Treatment with the modifier may be performed in either the liquid phase or in the vapor phase. In the liquid phase, the modifier is applied to the support as a liquid, either by itself or as a solution in a suitable solvent such as a hydrocarbon. In the vapor phase, the modifier is contacted with the support in the form of a gas or by injecting liquid modifier into the preheated support to vaporize the modifier. Treatment temperatures are preferably in the range of from about 20° C. to about 400° C. The modifier treatment step can be carried out in a batch, semi-continuous, or continuous manner.

The support is preferably heated at a temperature from about 50° C. to about 1000° C., more preferably from about 50° C. to about 800° C., either before or after the chemical modification. In another method, the support heat treatment and chemical modification occur simultaneously as the modifier in the vapor phase is passed over a heated support as discussed above.

The catalyst is particularly valuable for polymerizing olefins, preferably α-olefins. Suitable olefins include, for example, propylene, 1-butene, 1-hexene, 1-octene, ethylene and the like, and mixtures thereof. The catalyst is valuable for copolymerizing ethylene with α-olefins or diolefins (e.g., 1,3-butadiene, 1,4-hexadiene, 1,5-hexadiene).

The catalysts can be used in a variety of polymerization processes. They can be used in a liquid phase (slurry, solution, suspension, bulk), high-pressure fluid phase, or gas phase polymerization processes, or a combination of these. The pressure in the polymerization reaction zones typically ranges from about 15 psia to about 30,000 psia, and the temperature usually ranges from about −100° C. to about 300° C.

Catalysts of the invention are highly productive. Typical activities range from 900 to 7000 grams polymer per gram catalyst per hour, or higher (see Tables 1–5 below). Surprisingly, the use of modified supports leads to increased catalyst stability and shelf-life compared to catalysts using unmodified supports (see Tables 1 and 3 below). After 24 days of storage, a catalyst on an unmodified support loses 89% of its initial activity, while the activity loss of a boron-modified supported catalyst is only 35% after 35 days and 53% after 49 days (see Table 1). More striking is the effect of silylated supports on catalyst stability and shelf-life. Even after 132 days of storage, a catalyst supported on silica that is pretreated with hexamethyidisilazane (HMDS) retains essentially all of its initial activity (see Table 3). The catalysts on chemically modified supports also incorporate comonomers such as 1-butene well (see Table 4) compared with catalysts for which the support is unmodified. Chemical modification with organomagnesium compounds is particularly valuable for improving activity and half life when the single-site catalyst contains a quinolinoxy or pyridinoxy group (see Table 5).

The following examples merely illustrate the invention. Those skilled in the art will recognize many variations that are within the spirit of the invention and scope of the claims.

EXAMPLE 1

Improved Shelf-Life of Catalysts Supported On Trimethylborate-Treated Silica

Catalyst Preparation

Catalyst 1A: Silica (Davison 948, 10–20 g) is placed in a quartz tube with a frit acting as a gas distributor plate. Nitrogen is used to fluidize the silica in the tube. The tube is placed in a furnace, and the silica is heated at 150° C. for 4 h. The tube is then heated over 1 h to 250° C., and is then cooled to 150° C. Trimethylborate (1.6 mmol/g silica after correction for 5% volatiles in the silica) is added by syringe to the fluidized bed. The bed is fluidized for an additional 2 h, and is then cooled and discharged to a storage vessel under nitrogen.

Cyclopentadienyl(1-methylboratabenzene)zirconium dichloride (0.046 g, 0.12 mmol/g $SiO_2$) and trityl tetrakis (pentafluorophenyl)borate (0.13 g, 0.14 mmol/g $SiO_2$) are dissolved in toluene (5 mL) under nitrogen, and the mixture is transferred to a flask that contains the boron-modified silica (5 g). The resulting slurry is stirred for 1.5 h and is dried under vacuum. The dry catalyst is stored in a drybox.

Comparison Catalyst 1B is prepared under similar conditions except that the silica is not modified with trimethylborate prior to use.

Polymerization Runs

Polymerizations are performed in a two-liter, stainless-steel autoclave. Hydrogen (4 mmoles) is introduced into the reactor from a 50-mL vessel, with the amount added determined by measuring a pressure drop in the vessel. Triethylaluminum (0.75 mmoles; 0.3 mL of 1.5 M solution in heptane) is added to the reactor with isobutane (about 800 mL), and the temperature is allowed to equilibrate to 75° C. Ethylene is added to the reactor (to 400 psig), followed by a mixture of the supported catalyst and 0.2 mL of the triethylaluminum solution. (Alternatively, all of the triethylaluminum solution could be added initially with the isobutane.) The polymerization is conducted for approximately 1 h. See Table 1 for results.

Catalyst 1A and Comparison Catalyst 1B are each run under the polymerization conditions outlined above. Catalyst 1A, prepared with boron-modified silica, deactivates at a much slower rate upon storage than Comparison Catalyst 1B. After 24 days of storage, Comparison Catalyst 1B loses 89% of its initial activity. In contrast, Catalyst 1A loses only 35% of its initial activity after 35 days, and only 53% after 49 days. This example demonstrates the increased stability imparted by boron modification of the supported heterometallocene catalyst.

EXAMPLE 2

Catalysts Supported on HMDS-Treated Silica

Catalyst Preparation

Catalyst 2A: Neat hexamethyldisilazane (HMDS), in an amount equivalent to 12.5 wt. % of the silica, is slowly added to stirring silica. After treatment, the silica typically contains 4.04.2% carbon. The HMDS-treated silica is then stored before it is dried at 600° C. for 6 h in a fluidized bed dryer with dry nitrogen gas flow.

In an inert atmosphere (nitrogen) drybox, HMDS-treated silica (2.0 g) is transferred into a three-neck flask equipped with a gas inlet, an overhead stirrer, and a rubber septum. In a separate vial, bis(1-methylboratabenzene)zirconium dichloride (0.034 g, 0.10 mmol) and trityl tetrakis (pentafluorophenyl)borate (0.111 g, 0.12 mmol) are dissolved in dry toluene (2 mL). The vial is sealed with a rubber septum. The catalyst/cocatalyst solution is then added dropwise via syringe to the treated silica with rapid stirring, and the mixture is stirred for 30 min. The solvent is removed by vacuum, over 2 h, and the supported catalyst is isolated.

Catalyst 2B is prepared as described above except that the HMDS-treated silica is dried at 150° C.

Comparison Catalyst 2C is prepared as described above except that untreated silica, which is dried at 200° C., is used.

Polymerization Runs

Polymerizations are performed in a one-liter, stainless-steel autoclave. Hydrogen (40 mmoles) is introduced into the reactor from a 50-mL vessel, with the amount added determined by measuring a pressure drop in the vessel. Triethylaluminum (0.38 mmoles; 2.3 mL of 0.1 M solution in heptane) is added to the reactor with isobutane (about 500 mL), and the temperature is allowed to equilibrate to 75° C. Ethylene is added to the reactor (to 500 psig), followed by a mixture of the supported catalyst and 1.5 mL of the triethylaluminum solution. (Alternatively, all of the triethylaluminum solution could be added initially with the isobutane.) The polymerization is conducted for 1 h. See Table 2 for results.

As Table 2 shows, Catalyst 2A is much more active than Comparison Catalyst 2B (HMDS-treated, but dried at lower temperature) or Comparison Catalyst 2C (no HMDS treatment).

EXAMPLE 3

Improved Shelf-Life of Catalysts Supported on HMDS-Treated Silica

Catalyst Preparation

Catalyst 3: The procedure used to make Catalyst 2A is followed except that cyclopentadienyl(1-boratabenzene) zirconium dichloride (0.032 g, 0.010 mmol) is used instead of bis(1-boratabenzene)zirconium dichloride.

Polymerization Runs

Polymerizations are performed in a one-liter, stainless-steel autoclave. Hydrogen (0.7 mmoles) is introduced into the reactor from a 50-mL vessel with the amount added determined by measuring a pressure drop in the vessel. Triethylaluminum (0.38 mmoles; 2.3 mL of 0.1 M solution in heptane) is added to the reactor with isobutane (about 500 mL), and the temperature is allowed to equilibrate to 75° C. Ethylene is added to the reactor (to 400 psig), followed by a mixture of the supported catalyst and 1.5 mL of the triethylaluminum solution. (Alternatively, all of the triethylaluminum solution could be added initially with the isobutane.) The polymerization is conducted for 1 h. See Table 3 for results.

The catalyst prepared using HMDS-treated silica (Catalyst 3) retains essentially all of its initial activity even after 174 days of storage (see Table 3). In contrast, a similar catalyst supported on untreated silica loses 89% of its initial activity after only 24 days of storage (Table 1).

EXAMPLE 4

Catalysts Supported on Triethylborane-Treated Silica

Catalyst Preparation

Catalyst 4A: A solution of triethylborane (10 mL, 1.0 M in hexane) is added to a suspension of uncalcined silica (4.4 g, PQ-3030) in hexane (50 mL) at room temperature. The suspension is then refluxed for 7 h at 69° C. and filtered. The solids are washed with hexane (2×30 mL) and dried under vacuum for 3 h at room temperature. Cyclopentadienyl(1-methylboratabenzene)zirconium dichloride (0.022 g, 0.069 mmol) and polymethalumoxane (2 mL of Akzo PMAO-IP solution in toluene, 12.5% Al, 4.14 M) are dissolved in toluene (4 mL) at room temperature. This solution is added to the pretreated silica (0.71 g), and the mixture is stirred for 5 min. at room temperature. The slurry is then vacuum dried for 2 h, and the solid catalyst (4A) is isolated.

Catalyst 4B is prepared under similar conditions except that the uncalcined silica is not modified with triethylborane prior to use. In addition, the PMAO is added to the silica and stirred for about 20 min. before a toluene solution of cyclopentadienyl(1-methylboratabenzene)zirconium dichloride is added.

Catalyst 4C: A solution of triethylborane (2.5 mL, 1.0 M in hexane) is added to a suspension of silica (Davison 948, 1.0 g, pretreated with HMDS and then calcined at 150° C.) in hexane (10 mL) at room temperature. The suspension is stirred for 18 h at room temperature. A solution of cyclopentadienyl(1-methylboratabenzene)zirconium dichloride (0.031 g, 0.097 mmol) and trityl tetrakis (pentafluorophenyl)borate (0.123 g, 0.133 mmol) in toluene (15 mL) is then added. The suspension is stirred for 30 min. The slurry is then vacuum dried for 4 h to give Catalyst 4C.

Catalyst 4D: Neat triethylborane (95% purity, Aldrich; 2.58 g, 25 mmol) is added to a suspension of silica (Davison 948, 10.0 g, pretreated with HMDS and then calcined at 150° C.) in heptane (35 mL) at room temperature. The suspension is then refluxed (98° C.) for 6 h. Solvent is removed, and the support is dried under vacuum for 5 h. A portion of the triethylborane-treated support (1.20 g) is combined with a solution of cyclopentadienyl(1-boratabenzene)zirconium dichloride (42 mg, 0.13 mmol) and trityl tetrakis(pentafluorophenyl)borate (169 mg, 0.183 mmol) in toluene (8 mL). After stirring for about 1 h at room temperature, toluene is removed, and the supported catalyst is dried under vacuum for 5 h.

Polymerization Runs with Catalysts 4A and 4B

Polymerizations are performed in a one-liter, stainless-steel autoclave. Polymethalumoxane (1 mmole of PMAO-IP; 1 mL of 1.0 M solution in toluene) is added to the reactor with isobutane (about 350 mL). Ethylene is added to the reactor (to 400 psig), and the temperature is allowed to equilibrate to 80° C. The supported catalyst (105 mg) is then injected with isobutane (about 50 mL) under nitrogen pressure, and the polymerization is conducted for about 0.5 h. Comonomers (1-butene or 1-hexene), when used, are added into the reactor before the PMAO and isobutane. See Table 4 for results.

Polymerization Runs with Catalysts 4C and 4D

The procedure described above for use with Catalysts 4A and 4B is used with the following changes: No PMAO is added to the reactor; instead, triethylaluminum (TEAL, 0.5M solution in heptane, 0.38 or 0.50 mmol) is used, with half added before and half added after ethylene is introduced to the reactor. Runs with Catalyst 4C are performed at 80° C., while runs with Catalyst 4D are performed at 70° C. See Table 4.

As Table 4 shows, Catalyst 4A is only slightly more active for ethylene polymerization than Catalyst 4B. Surprisingly, however, boron modification of the support leads to a significant improvement in catalyst activity when a comonomer is included. When a catalyst is supported on untreated silica (4B), copolymerization with 1-butene increases activity about 28%. The same catalyst supported on triethylborane-treated silica (4A), however, gives a remarkable 100% activity increase when 1-butene is incorporated (see Table 4). As the examples with Catalysts 4C and 4D show, there are benefits in using multiple chemical treatments. Treatment of silica first with HMDS and then with triethylborane gives a highly active catalyst that incorporates comonomers well.

EXAMPLE 5

Catalyst Supported on Polymethalumoxane-Treated Alumina

Catalyst Preparation

Catalyst 5: A solution of polymethalumoxane (9.5 g of 4.2 M Akzo PMAO-IP solution in toluene, 12.9% Al) is added to a suspension of alumina (2.5 g, Capatal B, dried at 425° C. under flowing nitrogen) in toluene (15 mL) at room temperature. The suspension is stirred for 4 h at room temperature, and is then filtered. The solids are washed with toluene, then with hexane, and are dried under vacuum at room temperature. Cyclopentadienyl(1-dimethylaminoboratabenzene)zirconium dichloride (0.069 mmol) is dissolved in toluene (8 mL). The solution is added to the pretreated silica (0.60 g), and the mixture is stirred for 0.5 h at room temperature. The slurry is then filtered, and the solids are washed with toluene followed by hexane. The product is dried under vacuum to give Catalyst 5.

Polymerization Run

A polymerization is performed in a 1.7-L stainless-steel autoclave. Polymethalumoxane (7.8 mL of 0.1 M PMAO solution in toluene) is added to the reactor with hexane (about 750 mL). Supported Catalyst 5 (40 mg) is injected into the reactor, and 30 mmoles of hydrogen is added. Once the temperature equilibrates to 80° C., ethylene is introduced into the reactor (to 150 psig), and the polymerization is conducted for 1 h. Activity: 1588 g polymer/g catalyst/h.

EXAMPLE 6

Catalyst Supported on Trimethylaluminum-Treated Silica

Catalyst Preparation

Catalyst 6: A solution of trimethylaluminum (TMA) (3.5 mL of 1.44 M TMA in heptane, Akzo-Nobel) to a suspension of silica (6.0 g, PQ-3030, dried under vacuum at room temperature for 2 h) in toluene (15 mL) at room temperature. The suspension is then stirred for 20 min. at room temperature, filtered, and the solids are dried under vacuum. Cyclopentadienyl(1-methylboratabenzene)zirconium dichloride (0.026 g, 0.081 mmol) and trityl tetrakis (pentafluorophenyl)borate (0.075 g, 0.081 mmol) in toluene (25 mL) is then added to the TMA-treated silica (1.02 g), and the mixture is stirred for 0.5 h at room temperature. The slurry is then filtered. After vacuum drying for 2 h, solid Catalyst 6 is isolated.

Polymerization Run

A polymerization is performed in a 1.7-L stainless-steel autoclave. Triethylaluminum (TEAL) (4.0 mL of 0.1 M solution in hexane) is added to the reactor with hexane (about 750 mL). Supported Catalyst 5 (40 mg) is injected into the reactor, and the temperature is allowed to equilibrate to 80° C. Ethylene is introduced to the reactor (to 150 psig), and the polymerization is conducted for 2 h with no activity decay. Activity: 2338 g polymer/g catalyst/h.

EXAMPLE 7

Catalyst Supported on Organomagnesium-Treated Silica

Catalyst Preparation

Catalyst 7A: Silica (Davison 948, 5.0 g, pretreated with HMDS and then calcined 4 h at 600° C.) is added to heptane (25 mL), and the suspension is stirred under nitrogen at 25° C. for 0.5 h. Dibutylmagnesium (5.0 mL of 10 wt. % solution in heptane, 3.0 mmol) is added to the silica, and the treated suspension is stirred under nitrogen at 25° C. for another 0.5 h. 8-Quinolinoxy tribenzyltitanium (1.0 mmol) is dissolved in dichloromethane (25 mL) and stirred under nitrogen for 0.5 h to give a purple solution. This solution is then added to the treated silica suspension, and the mixture is stirred at 25° C. under nitrogen for 1 h. The solvent is removed under nitrogen, and the catalyst is dried under vacuum for 0.5 h. A dry, purple powder of supported catalyst (5.7 g) that contains 0.9 wt. % Ti is obtained.

Catalyst 7B: The procedure described for Catalyst 7A is followed except that the treatment with dibutylmagnesium is omitted. The resulting supported catalyst (5.3 g) contains 0.9 wt. % Ti.

Polymerization Runs

Polymerizations are performed in a 2-L slurry reactor using isobutane as a solvent. Prior to the polymerization, the reactor is conditioned by heating it to 120° C. for 20 min. under a stream of nitrogen. The reactor is then cooled to 80–85° C., and the activator (TEAL [Al:Ti=100] or MAO [Al:Ti=900], see Table 5) is injected. The reactor is then pressurized with hydrogen to 100–300 psig. Ethylene is then supplied to the reactor (to 500 psig) using a Brooks flow meter with feed on demand, and the reactor is allowed to equilibrate at 80–85° C. The supported catalyst is slurried in isobutane, and the slurry is injected into the reactor; more isobutane is used as a rinse (800 mL total). The polymerizations are generally conducted for 1 h at 80–85° C. External heating or cooling is used to maintain the reaction temperature at 80–85° C. Activities and catalyst half-lives are summarized in Table 5.

Half life is measured from a plot of ethylene consumption (from flow rate) versus time. The time needed for the catalyst's activity to reach 50% of its initial peak value is reported as its half life. When half life is being measured, the polymerization is performed for at least the amount of time needed for the activity to reach 50% of the initial peak value.

COMPARATIVE EXAMPLE 8

Unmodified Silica Support For Heterometallocene and Metallocene Catalysts

Catalyst Preparation

Comparative Catalyst 8A: Silica (Davison 948) is pre-dried at 275° C. under nitrogen flow. Three grams of the dried silica are then transferred to a flask equipped with an overhead stirrer. In a separate bottle, bis(1-methylboratabenzene)zirconium dichloride (0.14 g) and poly(methylalumoxane) (6.8 mL of 4.3 M PMAO-IP in toluene; from Akzo Nobel Chemicals) are mixed. The catalyst/cocatalyst solution is then added to the stirring silica via cannula. The bottle containing the catalyst/cocatalyst solution is washed with toluene (5 mL), and the washings are added to the silica. The resulting slurry is stirred for 1 h at room temperature, and is then dried at 50° C. under flowing nitrogen. The solids are washed with hexane (10 mL), filtered, and dried under vacuum. The catalyst contains 0.57 wt. % Zr.

Comparative Catalyst 8B is prepared using the above procedure except that methalumoxane (20.1 mL of 1.45 M MAO; from Albemarle Chemicals) is used in place of the polymethalumoxane solution. The catalyst contains 0.54 wt. % Zr.

Comparative Catalyst 8C: Silica (Davison 948) is pre-dried at 275° C. A toluene solution of bis(indenyl)zirconium dichloride (25.7 g) and poly(methylalumoxane) (1911 mL of 7.5 wt. % PMAO in toluene from Akzo Nobel Chemicals) is prepared. The catalyst/cocatalyst solution is then added to stirring silica (468 g). The resulting slurry is stirred for 30 min. at room temperature, and is then dried at 50° C. under flowing nitrogen. The solids are washed with hexane (400 mL), filtered, and dried under vacuum. The catalyst contains 0.70 wt. % Zr.

Polymerization Runs

Polymerizations are performed in a 1.7-L stainless-steel, stirred reactor. Dry, oxygen-free hexane (850 mL) is charged to the dry, oxygen-free reactor at room temperature. Triethylaluminum (0.20 mmol; from Akzo Nobel Chemicals) is charged to the reactor as a poison scavenger. The reactor is heated to 80° C. and allowed to equilibrate. Ethylene is then introduced to a total pressure of 150 psig, and the reactor is allowed to equilibrate again. A suspension of catalyst in hexane (69 mg of Catalyst 8A, 69 mg of Catalyst 8B, or 29 mg of Catalyst 8C) is injected into the reactor to start the polymerization. Ethylene is fed to keep the pressure constant at 150 psig. The reaction is stopped at the end of 60 min. for Catalysts 8B and 8C and 20 min. for Catalyst 8A. See Table 6 for results.

Catalysts 8A and 8B, prepared using the heterometallocene, gave no polymer. In contrast, Catalyst 8C, prepared from the metallocene bis(indenyl)zirconium dichloride, polymerizes olefins. This example shows that a support treatment step is critical for making supported heterometallocene catalysts that actively polymerize olefins, while treating the support is less important for traditional metallocenes.

TABLE 1

Effect of Trimethylborate Treatment of Silica on Catalyst Activity and Stability

| Catalyst ID | Support | Storage time (days) | Activity (g/g cat/hr) |
| --- | --- | --- | --- |
| 1A | B(OMe)$_3$ treated SiO$_2$ | 2 | 4369 |
| 1A | B(OMe)$_3$ treated SiO$_2$ | 35 | 2860 |
| 1A | B(OMe)$_3$ treated SiO$_2$ | 49 | 2040 |
| IB* | SiO$_2$ | 0 | 3550 |
| IB* | SiO$_2$ | 24 | 399 |

Catalyst: cyclopentadienyl(1-methylboratabenzene)zirconium dichloride; activator: trityl tetrakis(pentafluorophenyl)borate.
*Comparative example

TABLE 2

Effect of Thermal and HMDS Treatment of Silica on Catalyst Activity

| Catalyst ID | Support | Thermal treatment (° C.) | Activity (g/g cat/hr) |
| --- | --- | --- | --- |
| 2A | HMDS SiO$_2$ | 600 | 895 |
| 2B | HMDS SiO$_2$ | 150 | 287 |
| 2C* | SiO$_2$ | 200 | 100 |

Catalyst: bis(1-methylboratabenzene)zirconium dichloride; activator: trityl tetrakis(pentafluorophenyl)borate.
*Comparative example

TABLE 3

Effect of HMDS Treatment of Silica on Catalyst Stability

| Catalyst ID | Support | Storage time (days) | Activity (g/g cat/hr) |
| --- | --- | --- | --- |
| 3 | HMDS SiO$_2$ | 0 | 1627 |
| 3 | HMDS SiO$_2$ | 174 | 1775 |

Catalyst: cyclopentadienyl(1-methylboratabenzene)zirconium dichloride; activator: trityl tetrakis(pentafluorophenyl)borate.

TABLE 4

Effect of Triethylborane Treatment of Silica on Copolymerization of Ethylene with Butene or Hexene

| Catalyst ID | Silica Support treatment | Treatment temp. (° C.) | Activator | TEAL (mmol) | Comonomer | Polym. temp. (° C.) | Activity (g polymer/ g cat/h) |
|---|---|---|---|---|---|---|---|
| 4A | BEt$_3$ | 69 | PMAO | 0 | none | 80 | 1339 |
| 4A | BEt$_3$ | 69 | PMAO | 0 | butene, 20 mL | 80 | 2745 |
| 4B* | none | — | PMAO | 0 | none | 80 | 1208 |
| 4B* | none | — | PMAO | 0 | butene, 20 mL | 80 | 1519 |
| 4C | BEt$_3$/HMDS | 25 | borate | 0.50 | none | 80 | 1592 |
| 4C | BEt$_3$/HMDS | 25 | borate | 0.50 | butene, 20 mL | 80 | 3910 |
| 4C | BEt$_3$/HMDS | 25 | borate | 0.50 | hexene, 20 mL | 80 | 4705 |
| 4D | BEt$_3$/HMDS | 98 | borate | 0.38 | butene, 20 mL | 70 | 6262 |
| 4D | BEt$_3$/HMDS | 98 | borate | 0.38 | hexene, 20 mL | 70 | 7708 |

Catalyst: cyclopentadienyl(1-methylboratabenzene)zirconium dichloride; activator: PMAO = polymethalumoxane; borate = trityl tetrakis(pentafluorophenyl)borate. Each of the treated catalysts has a long half life; the activity remains essentially constant throughout the polymerization.
*Comparative example

TABLE 5

Effect of Dibutylmagnesium Treatment of Silica on Catalyst Activity and Half Life

| Catalyst ID | Support | Activator | Activity (g/g cat/hr) | Catalyst Half life (h) |
|---|---|---|---|---|
| 7A | Bu$_2$(Mg) treated SiO$_2$ | TEAL | 2340 | >1 |
| 7A | Bu$_2$(Mg) treated SiO$_2$ | MAO | 1800 | >1 |
| 7B* | SiO$_2$ | TEAL | 1620 | 0.5–1 |
| 7B* | SiO$_2$ | MAO | 1080 | 0.5–1 |

Catalyst: 8-quinolinoxy tribenzyltitanium.
*Comparative example

TABLE 6

Effect of Untreated Silica Supports on Activity of Heterometallocenes versus Metallocenes

| Catalyst ID | Supported Catalyst | Activator | Activity (g/g cat/hr) |
|---|---|---|---|
| 8A* | (MeBBZ)$_2$ZrCl$_2$ | PMAO-IP | 0 |
| 8B* | (MeBBZ)$_2$ZrCl$_2$ | MAO | 0 |
| 8C* | (Ind)$_2$ZrCl$_2$ | PMAO | 616 |

*Comparative examples

We claim:

1. A supported catalyst system which comprises:
   (a) a support chemically treated with an effective amount of a modifier selected from the group consisting of organoaluminum, organosilicon, organomagnesium, and organoboron compounds;
   (b) a single-site catalyst that contains at least one anionic, polymerization-stable, heteroatomic ligand; and
   (c) an activator.

2. The catalyst system of claim 1 wherein the modifier is selected from the group consisting of alumoxanes, alkyl aluminums, alkyl aluminum halides, alkylsilyl halides, alkyldisilazanes, alkyl and aryl alkoxysilanes, alkyl, aryl, and aralkyl magnesium compounds, and alkyl, aryl, and alkoxyboranes.

3. The catalyst system of claim 1 wherein the support is heated at a temperature within the range of about 50° C. to about 1000° C. before, during, or after the chemical treatment.

4. The catalyst system of claim 1 wherein the support is selected from the group consisting of silicas, aluminas, silica-aluminas, silicates, titanias, zirconias, magnesias, magnesium chloride, polystyrene, and mixtures thereof.

5. The catalyst system of claim 1 wherein the heteroatomic ligand is selected from the group consisting of boraaryl, pyridinyl, quinolinyl, azaborolinyl, pyrrolyl, and mixtures thereof.

6. The catalyst system of claim 1 wherein the activator is selected from the group consisting of alumoxanes, neutral boron compounds, and ionic borates.

7. A method which comprises:
   (a) treating a support with an effective amount of a modifier selected from the group consisting of organoaluminum, organosilicon, organomagnesium, and organoboron compounds; and
   (b) combining the treated support with a single-site catalyst that contains at least one anionic, polymerization-stable, heteroatomic ligand, and optionally with an activator, to produce a supported catalyst.

8. The method of claim 7 wherein the modifier is selected from the group consisting of alumoxanes, alkyl aluminums, alkyl aluminum halides, alkylsilyl halides, alkyldisilazanes, alkyl and aryl alkoxysilanes, alkyl, aryl, and aralkyl magnesium compounds, and alkyl, aryl, and alkoxyboranes.

9. The method of claim 7 wherein the support is heated at a temperature within the range of about 50° C. to about 1000° C. prior to treatment with the modifier.

10. The method of claim 7 wherein the treated support from step (a) is heated at a temperature within the range of about 50° C. to about 1000° C. prior to combining it with the single-site catalyst.

11. The method of claim 7 wherein the support is heated at a temperature within the range of about 50° C. to about 1000° C. during chemical treatment.

12. The method of claim 7 wherein the support is selected from the group consisting of silicas, aluminas, silica-aluminas, silicates, titanias, magnesias, magnesium chloride, polystyrene, and mixtures thereof.

13. The method of claim 7 wherein the heteroatomic ligand is selected from the group consisting of boraaryl, pyridinyl, quinolinyl, azaborolinyl, pyrrolyl, and mixtures thereof.

14. The method of claim 7 wherein the activator is selected from the group consisting of alumoxanes, neutral boron compounds, and ionic borates.

15. A process which comprises polymerizing an olefin in the presence of the catalyst system of claim 1.

16. A process which comprises copolymerizing ethylene with a $C_3$–$C_{10}$ α-olefin in the presence of the catalyst system of claim 1.

* * * * *